June 25, 1963    J. T. DEWAN    3,095,505
APPARATUS FOR EXPLORING BOREHOLES
Filed June 17, 1959    2 Sheets-Sheet 2
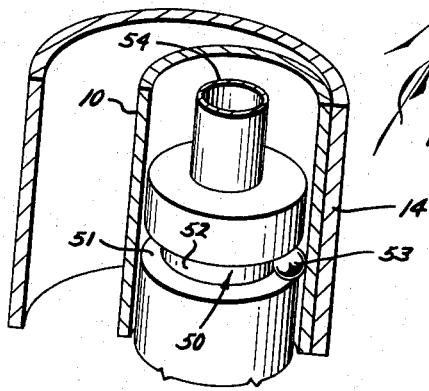
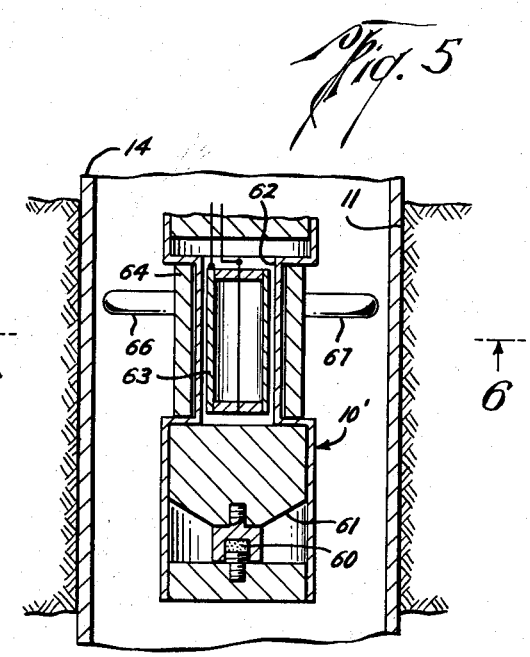
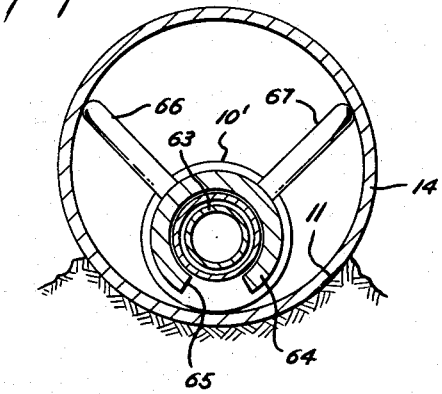
John T. Dewan
INVENTOR.
BY Robert Hockfield
ATTORNEY United States Patent Office 3,095,505
Patented June 25, 1963

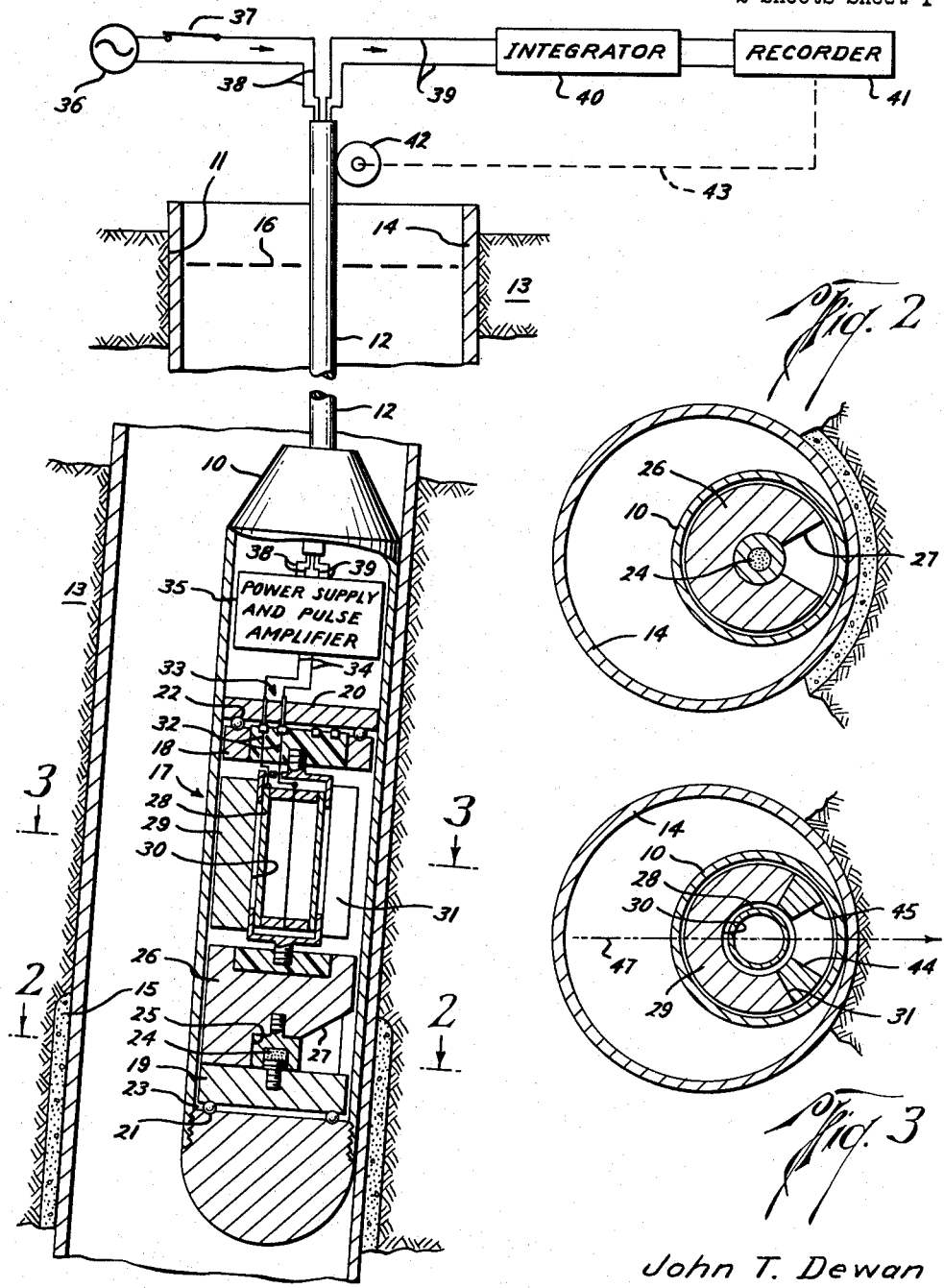

3,095,505
APPARATUS FOR EXPLORING BOREHOLES
John T. Dewan, Houston, Tex., assignor to Schlumberger Well Surveying Corporation, Houston, Tex., a corporation of Texas
Filed June 17, 1959, Ser. No. 820,994
15 Claims. (Cl. 250—83.3)

This invention relates to apparatus for exploring boreholes and, more particularly, pertains to new and improved radiant energy exploration apparatus of the sidewall type.

In certain applications of radiant energy exploration apparatus, it is important to maintain one portion of an instrument in engagement with the sidewall of the borehole and to shield the remainder of the instrument. Thus, indications due primarily to material behind the sidewall are obtained while the indications are substantially unaffected by the contents of the borehole. For example, it has been proposed that a gamma ray source and a gamma ray detector provided with an appropriate gamma ray shield that includes a portion having a radiation-admitting aperture be passed through a borehole with the apertured portion of the shield in contact with the sidewall. Indications of the intensity or flux of the gamma rays that pass from the source, through a portion of the material behind the sidewall of the borehole and into the detector represent the density of the material. In a more specific situation, such as in the environment of a well in which a casing is cemented, it is possible to use such apparatus to locate the upper limit of the cement, usually referred to as the "cement top."

Sidewall instruments have been used heretofore with considerable success in many applications. However, the desired orientation may not always be maintained because the electric cable on which an instrument is supported may sometimes become twisted thereby producing a torque which tends to impair wall contact.

It is an object of the present invention, therefore, to provide new and improved radiant energy exploration apparatus for use in boreholes which features highly effective and reliable directional characteristics.

Another object of the present invention is to provide new and improved radiant energy apparatus for use in boreholes which is adapted to maintain a selected orientation relative to its directional characteristics with a high degree of consistency.

A further object of the present invention is to provide new and improved directional radiant energy apparatus for use in boreholes in which the effects of cable torque on wall contact are minimized.

Yet another object of the present invention is to provide new and improved directional, oriented borehole apparatus which is relatively simple and inexpensive to construct and yet is entirely efficient and reliable in operation.

Borehole exploration apparatus in accordance with the present invention is comprised of a support adapted to be passed through the borehole and which carries radiant energy means and shield means operatively associated with one another to provide a directional radiation pattern with respect to a plane perpendicular to a vertical or longitudinal axis for the apparatus. At least one of these means is mounted for rotation about the vertical axis to permit effective rotation of the radiation pattern about the axis. The apparatus further comprises means sensitive to the position of the support in the borehole for controlling rotation of the rotatably mounted means so as to maintain the pattern in a selected orientation with respect to the shortest radial distance between the aforesaid vertical axis and the sidewall of the borehole.

According to a particular embodiment of the invention, magnetic means are provided for controlling rotation. Specifically, one or more permanent magnets may be attached to a shield which encircles either or both of the radiation source and the radiation detector and which has a radiation-admitting aperture. Thus, when the apparatus is utilized in a borehole containing a tubular casing constructed of a ferromagnetic material, the magnet means is attracted toward the casing and thereby controls rotation.

Alternatively, the radiant energy source may be in the form of a magnetized member arranged to traverse a track which extends circumferentially about a cylindrical shield. Accordingly, when inside a ferromagnetic casing, the source obtains a position relative to the shield which is aligned with the shortest radial distance between the axis of the cylindrical shield and the inner wall of the casing.

In accordance with another embodiment of the present invention, the radiant energy means is supported within a housing that is adapted to be passed through the borehole and a radiant energy shield is supported outside the housing. The shield is rotatable about the vertical axis and is operatively associated with the radiant energy means thereby to afford a rotatable directional pattern. To control rotation of the shield, wall-engaging means are connected to it and extend therefrom essentially to one side of a plane containing the vertical axis of the apparatus. More specifically, the shield is provided with a radiation-admitting aperture and the wall-engaging means extends from the shield in a generally radial direction away from the aperture. The radiant energy means may be either or both of a radiant energy source and a radiant energy detector.

The novel features of the present invention are set forth with particularity in the appended claims. The present invention, both as to its organization and manner of operation, together with further objects and advantages thereof, may best be understood by reference to the following description taken in connection with the accompanying drawings in which:

FIG. 1 is an elevational view of apparatus constructed in accordance with the present invention, portions being shown cut-away and in cross section to reveal certain interior details;

FIGS. 2 and 3 are cross-sectional views taken along lines 2—2 and 3—3, respectively, of the apparatus shown in FIG. 1;

FIG. 4 is a perspective view of a portion of apparatus constructed in accordance with another embodiment of the present invention;

FIG. 5 is a view in longitudinal cross section of a portion of apparatus featuring yet another embodiment of the present invention; and FIG. 6 is a cross-sectional view taken along line 6—6 of the apparatus illustrated in FIG. 5.

In FIG. 1 of the drawings, apparatus constructed in accordance with the present invention is shown to comprise a housing 10 constructed of a radiant energy transparent, nonmagnetic material, such as Bakelite or certain types of stainless steel, suspended in a borehole 11 by an armored electric cable 12. In the particular application illustrated, borehole 11 penetrates earth formations 13 and is provided with a tubular member or well casing 14 constructed, for example, of steel. Casing 14 is cemented in place in the usual manner and a body of cement 15 sealingly secures the casing 14 within the borehole 11. As will be described, it is the function of the apparatus including housing 10 to locate the top of the cement 15. To explore the borehole, the housing is lowered and raised by means of a winch (not shown) on which the cable 12 is spooled in the usual fashion. While the apparatus may be employed in a borehole that is dry, because of the presence of conditioning liquid 16 which fills the interior space of casing 14, certain directional characteristics of the apparatus, to be apparent from the discussion to follow, are desirable.

Disposed within housing 10 is a carriage 17 that includes upper and lower bearing members 18 and 19 positioned adjacent to cooperating upper and lower track members 20 and 21. Members 20 and 21 have appropriate bearing races and an upper set of ball bearings 22 is disposed between members 18 and 20 and a lower set of ball bearings 23 is disposed between members 19 and 21. The carriage 17 is thus supported for rotation about a vertical or longitudinal axis of the housing 10.

Supported above member 19 is a radiant energy source 24 composed, for example, of radium which emits gamma rays. The source 24 is contained within an opening 25 in a generally cylindrical shield 26 constructed, for example, of lead so as to block gamma radiation from the source 24. An opening or aperture 27 in the shield 26 permits gamma radiation to pass from the source in an essentially beam-shaped pattern out of the housing 10 and through the casing 14. Thus, as may be best seen in FIG. 2, shield 26 is operatively associated with radiant energy means 24 to provide a directional radiation pattern with respect to a plane perpendicular to the vertical axis of housing 10. Since shield 26 is mounted on the carriage 17, rotation of the carriage affords effective rotation of the radiation pattern about the vertical axis.

Spaced vertically from the source is a radiant energy detector 28 which may, for example, be a Geiger-Mueller tube that responds to gamma radiation in a known manner. Tube 28 is aligned with the vertical axis of the housing 10 and is generally cylindrical. A general cylindrical tubular shield 29 constructed, for example, of lead which blocks the passage of gamma radiation, has a longitudinal opening 30 sized to receive the detector 28. A radial opening 31 in shield 29, best seen in FIG. 3, provides a radiation-admitting aperture through which gamma rays may pass to the detector 28. Shield 29 is thus operatively associated with radiant energy means 28 to provide a directional radiation pattern with respect to a plane perpendicular to the vertical axis of the housing 10 and rotation of the carriage 17 affords effective rotation of this pattern about the vertical axis.

A pair of electrical conductors 32 are connected to the detector 28 and are, in turn, connected by slip rings 33 to another pair of conductors 34 that extend to a power supply and pulse amplifier unit 35 within housing 10. An alternating current source 36 at the surface of the earth, provided with an operating switch 37, is connected via insulated electrical conductors 38 of cable 12 to unit 35 so that appropriate energization potentials for the detector 28 may be supplied. Another pair of conductors 39 extend from unit 35 through cable 12 to an integrator 40 at the surface of the earth. The integrator is coupled to a recorder 41 in which the recording medium is driven in synchronism with movement of housing 10 through the borehole 11 by means of a measuring wheel 42 that is mechanically coupled to cable 12 and to the recorder by an appropriate linkage, schematically represented by broken line 43. The details of units 35, 40 and 41 may follow conventional practice and thus a further description is deemed unnecessary.

To control rotation of carriage 17 so as to maintain apertures 27 and 31 in a selected orientation with respect to the shortest radial distance between the vertical axis of housing 10 and the sidewall of borehole 11, a pair of permanent magnets 44 and 45 (FIG. 3) are secured adjacent to respective surfaces of the aperture 31. The magnets may be constructed of an alloy of aluminum, nickel and cobalt, commonly referred to as "Alnico," and are positioned with poles of unlike polarity facing one another.

Accordingly, the magnet means 44, 45 exhibits a magnetic axis defined by broken line 47 in FIG. 3 which bisects the angle of aperture 31 and which is vertically aligned with the zones of maximum response of the radiation patterns created by apertures 27 and 31. In other words, the area of maximum attractive force for a ferromagnetic or magnetized material is in vertical alignment with the maximum responses of the radiation patterns.

In operation, housing 10 is passed through the well casing 14 and since the borehole 11 is usually not precisely vertical, the housing will rest against a sidewall portion of the casing as shown in FIG. 1. With switch 37 closed, source 36 provides the power to unit 35 for energizing detector 28. Gamma radiation from source 24 passes through aperture 27 and enters any material adjacent to the housing. Some of the gamma radiation from the irradiated material passes through aperture 31 and impinges on detector 28. The detector produces pulse responses which occur at a rate dependent upon the intensity or flux of the incident gamma radiation and such pulses are amplified in unit 35 and supplied to integrator 40 which derives a potential representing the pulse rate. That potential is applied to the recorder 41 so that a continuous record of pulse rate as a function of depth is obtained.

As the housing 10 moves through the casing, magnet means 44, 45 rotates the carriage 17 by magnetic attraction to the ferromagnetic casing until magnetic axis 47 is aligned with the shortest radial distance between the vertical axis of the housing 10 and the sidewall of the borehole 11. Consequently, the orientation of the carriage illustrated in FIGS. 1–3 is always maintained. As the housing reaches a level in the borehole just above cement 15, a marked change in counting rate indicative of a decrease in density is observed. This is thought to be attributable to an annulus of mud, constituted of more or less settled drilling mud, between the casing 14 and the formations just above cement column 15. Thus, there is produced an indication in recorder 41 of the location of the upper end of the cement. Since the shields 26 and 29 minimize the transmission of gamma radiation between source 24 and detector 28 through well fluid 16, masking effects which might ordinarily occur are eliminated. Thus, accurate indications of density are obtained and the upper extremity of the cement 15 is accurately denoted.

The magnet means 44, 45 maintains the position of carriage 17 even though the housing 10 may rotate during passage through the borehole 11 as a result of cable torque. Thus, the desired directional characteristics are always achieved. In other words, highly effective and reliable directional characteristics are featured in apparatus embodying the present invention. From an inspection of FIGS. 1–3, it is evident that apparatus constructed in accordance with the present invention is relatively simple and inexpensive to construct while affording the above-noted efficient and reliable operating characteristics.

Although the source 24 and the detector 28 have been described as radiant energy means of one type, obviously, other radiant energy sources and detectors may be employed such as sources and detectors of neutrons, beta-particles, X-rays or any combination of these.

It should be evident that the magnet means 44, 45 tends to maintain the housing 10 against the casing 14. In some applications in which the equipment also includes a casing collar locator of the magnetic type, such as disclosed in Patent No. 2,558,427, there will be an additional force tending to hold the instrument against the casing.

Although in the embodiment of FIG. 1, both the source and detector are directional and are rotated with carriage 17, if desired the source may be arranged to radiate equally in all horizontal directions and thus only the detector shield 29 need be rotated. As a further alternative, an omnidirectional detector may be employed and only shield 26 for the radiation source utilized. In either of these cases, the shield is controlled in the same manner described in connection with the embodiment of FIGS. 1–3.

In accordance with another embodiment of the invention shown in FIG. 4, a generally cylindrical shield 50 is supported coaxially within housing 10. The shield is provided with a cylindrical recess 51 defining a track encircling a central portion 52 of the shield. Track 51 defines a bearing surface lying in a plane perpendicular to the vertical axis of housing 10 and a radiant energy source 53 of generally spherical configuration is supported for rolling movement on track 51. It is evident that sphere 53 always positions itself under the force of gravity on the low side of the housing 10 which is the one closest to the corresponding sidewall portion of the casing 14. Accordingly, movement of source 53 affords effective rotation of a directional pattern produced by shield 50 in response to the position of housing 10 relative to true vertical. Gamma radiation from source 53 passes through the wall of casing 14 and irradiates adjacent materials. Some of the radiation from these materials returning toward the housing 10 intercepts a gamma radiation detector 54 and an output signal is developed which may be supplied to an indicator system such as illustrated in FIG. 1.

Spherical member 53 may also include magnetizable means. For example, an Alnico ball having a quantity of radium contained within a central opening may be employed. Thus, the member 53 may be made responsive to the presence of a sidewall portion of ferromagnetic casing or tube 14 thus assisting in maintaining the member 53 close to the casing. Using either or both the gravity and magnetic effects, movement of member 53 is controlled to maintain the radiation pattern in a selected orientation with respect to the shortest radial distance between the axis of housing 10 and the sidewall of casing 14.

In the embodiment of the invention illustrated in FIG. 5, a modified housing 10' contains a nondirectional gamma ray source 60 supported below a cylindrical shield 61. Above shield 61, housing 10' has a section 62 of reduced diameter and, like the remainder of the housing, of cylindrical configuration. Radiant energy detector or Geiger-Mueller tube 63 is supported within cylindrical section 62 in coaxial alignment therewith and a radiation shield 64 of generally tubular configuration receives section 62 of the housing for rotation with respect thereto. As seen in FIG. 6, shield 64 has a radiation-admitting aperture 65 and, like the arrangement of FIGS. 1–3, the shield is operatively associated with detector 63 to provide a directional radiation pattern with respect to a plane perpendicular to the vertical axis of housing 10'. Since the shield 64 is rotatable about the vertical axis, rotation of the radiation pattern about the vertical axis is afforded.

In order to control rotation of shield 64 to maintain aperture 65 substantially aligned with the shortest radial distance between the vertical axis of housing 10' and the sidewall of the borehole, a pair of wall-engaging fingers 66 and 67 are connected to the shield and extend in generally radial directions away from the aperture 65. In other words, the wall-engaging means 66, 67 extend from the shield in a generally radial direction essentially to one side of a plane containing the longitudinal axis of housing 10', with aperture 65 on the opposite side of that plane. It is thus evident that the housing 10' is maintained in engagement with the inner wall of casing 14 as the apparatus is passed through the casing, and fingers 66 and 67 control rotation of shield 64 so that the aperture 65 always faces the closest sidewall portion of the casing.

If desired, an arrangement similar to the one illustrated in FIGS. 5 and 6 may be employed to control the radiation pattern for a radiant energy source.

It is evident from the foregoing discussions that apparatus embodying the present invention efficiently maintains desired directional characteristics and is free from detrimental effects which might be produced by torque in the supporting cable.

Moreover, while these highly useful results are obtained in each of the several embodiments of the invention, an inspection of FIGS. 1–6 reveals that the apparatus in each case is relatively simple and inexpensive to construct.

While particular embodiments of the present invention have been shown and described, it is apparent that changes and modifications may be made without departing from this invention in its broader aspects, and therefore the aim in the appended claims is to cover all such changes and modifications as fall within the true spirit and scope of this invention.

What is claimed is:

1. Apparatus for exploring boreholes comprising: a support adapted to be passed through a borehole and slide along a side of the borehole; radiant energy means and shield means carried by said support and operatively associated with one another to provide a radial directional radiation pattern with respect to a vertical axis for said apparatus, at least one of said means being mounted for rotation about said axis to permit effective rotation of said pattern about said axis; and means coupled to said one means for aligning said pattern in a selected orientation with respect to the shortest radial distance between said axis and the sidewall of the borehole.

2. Apparatus for exploring boreholes comprising: a support adapted to be passed through a borehole and slide along a side of the borehole; a radiant energy source and a radiant energy detector carried by said support; shield means operatively associated with said source and said detector to provide radial directional radiation pattern for each with respect to a vertical axis for said apparatus and mounted on said support for rotation about said axis to permit effective rotation of said patterns about said axis; and means coupled to said shield means for aligning said patterns in a selected orientation with respect to the shortest radial distance between said axis and the sidewall of the borehole.

3. Apparatus for exploring boreholes comprising: a support adapted to be passed through a borehole and slide along a side of the borehole; a carriage mounted on said support for rotation with respect thereto about a vertical axis for said apparatus; a radiant energy source means mounted on said carriage; a radiant energy detector means mounted on said carriage; a radiant energy shield mounted on said carriage, having a radiation-admitting aperture and operatively associated with one of the aforesaid means to provide a radial directional radiation pattern with respect to said axis, rotation of said carriage about said axis affording effective rotation of said pattern about said axis; means coupled to said shield means for aligning said aperture in a selected orientation with respect to the shortest radial distance between said axis and the sidewall of the borehole; and indicator means electrically connected to said detector.

4. Apparatus for exploring boreholes comprising: a support adapted to be passed through a borehole and slide along a side of the borehole; a radiant energy detector fixed to said support; shield means operatively associated with said detector to provide a radial directional radiation pattern with respect to a vertical axis for said apparatus, said shield means being mounted on said support for rotation about said axis to permit effective rotation of said pattern about said axis; and means coupled to said shield means for aligning said pattern in a selected orientation with respect to the shortest radial distance between said axis and the sidewall of the borehole.

5. Apparatus for exploring boreholes containing a tubular casing constructed of a ferromagnetic material, said apparatus comprising: a support adapted to be passed through the casing and slide along a side of the casing; radiant energy means and shield means carried by said support and operatively associated with one another to provide a radial directional radiation pattern with respect to a vertical axis for said apparatus, at least one of said means being mounted for rotation about said axis to permit effective rotation of said pattern about said axis; and magnet means connected to said one means and adapted to be attracted toward the casing thereby to control rotation of said one means and maintain said pattern in a selected orientation with respect to the shortest radial distance between said axis and the sidewall of the borehole.

6. Apparatus for exploring boreholes containing a tubular casing constructed of a ferromagnetic material, said apparatus comprising: a support adapted to be passed through a casing and slide along a side of the casing; radiant energy means and shield means carried by said support and operatively associated with one another to provide a radial directional radiation pattern with respect to a vertical axis for said apparatus exhibiting a zone of maximum response, said shield means being mounted for rotation about said axis to permit effective rotation of said pattern about said axis; and magnet means connected to said shield means and exhibiting a magnetic axis vertically aligned with said zone of maximum response, said magnet means being adapted to be attracted toward the casing thereby to control rotation of said shield means and maintain said zone of maximum response substantially aligned with the shortest radial distance between said axis and the sidewall of the borehole.

7. Apparatus for exploring boreholes comprising: a support adapted to be passed through a borehole and slide along a side of the borehole; and radiant energy means and shield means carried by said support and operatively associated with one another to provide a radial directional radiation pattern with respect to a vertical axis for said apparatus, at least one of said means being mounted for rotation about said axis to permit effective rotation of said pattern about said axis, and being gravity responsive thereby to control rotation of said one means in response to the position of said support relative to true vertical and maintain said pattern in a selected orientation with respect to the lower sidewall of the borehole.

8. Apparatus for exploring boreholes comprising: a support adapted to be passed through a borehole and slide along a side of the borehole; radiant energy shield means fixed to said support and including a portion aligned with a vertical axis for said apparatus; a track encircling said portion of said shield means; and a radiant energy source supported for movement along said track and operatively associated with said shield means to provide a radial directional radiation pattern with respect to said axis, movement of said source affording effective rotation of said pattern about said axis.

9. Apparatus for exploring boreholes comprising: a support adapted to be passed through a borehole and slide along a side of the borehole; radiant energy shield means carried by said support and including a generally cylindrical portion supported in fixed relation to a vertical axis for said support; a track extending circumferentially about said cylindrical portion of said shield means and having a bearing surface lying defining a plane perpendicular to said axis; a radiant energy source of generally spherical configuration supported for rolling movement on said track, said source being operatively associated with said shield means to provide a radial directional radiation pattern with respect to said axis, movement of said source affording effective rotation of said pattern about said axis in response to the position of said support relative to true vertical; means responsive to radiant energy resulting from irradiation of material by radiant energy emanating from said source for developing an output signal; and indicating means electrically coupled to said last-mentioned means for providing indications dependent upon said output signal.

10. Apparatus for exploring boreholes containing a tube constructed of a ferromagnetic material, said apparatus comprising: a support adapted to be passed through the tube and slide along a side of the tube; radiant energy shield means carried by said support and including a portion aligned with a vertical axis for said apparatus; a track encircling said portion of said shield means; a member supported for movement along said track including radiant-energy-emitting material operatively associated with said shield means to provide a radial directional radiation pattern with respect to said axis, movement of said member affording effective rotation of said pattern about said axis, and including magnetizable means responsive to the presence of a sidewall section of the tube to control movement of said member thereby to maintain said pattern in a selected orientation with respect to the shortest radial distance between said axis and the sidewall of the tube; means responsive to radiant energy resulting from irradiation of material by radiant energy emanating from said source for developing an outpt signal; and indicating means electrically coupled to said last-mentioned means for providing indications dependent upon said output signal.

11. Apparatus for exploring boreholes comprising: a housing adapted to be passed through a borehole and slide along a side of the borehole; radiant energy means supported within said housing; radiant energy shield means supported outside said housing and operatively associated with said radiant energy means to provide a radial directional radiation pattern with respect to a vertical axis for said apparatus, said shield mens and said housing being relatively rotatable about said axis; and means for urging said shield means towards the sidewall of the bore thereby to maintain said pattern in a selected orientation with respect to the shortest radial distance between said axis and the sidewall of the borehole.

12. Apparatus for exploring boreholes comprising: a housing adapted to be passed through a borehole and slide along a side of the borehole; radiant energy means supported within said housing; radiant energy shield means supported outside said housing for rotation with respect thereto about a vertical axis for said apparatus and operatively associated with said radiant energy mens to provide a radial directional radiation pattern with respect to said axis, and wall-engaging means connected to said shield means and extending therefrom essentially to one side of a plane containing said axis to maintain said shield means proximate to the sidewall of the borehole thereby maintaining said pattern in a selected orientation with respect to the shortest radial distance between said axis and the sidewall of the borehole.

13. Apparatus for exploring boreholes comprising: a generally cylindrical housing adapted to be passed through a borehole and slide along a side of the borehole; radiant energy means carried within said housing; radiant energy shield means of generally tubular configuration receiving said housing for rotation with respect thereto and having a radiation-admitting aperture, said shield means being operatively associated with said radiant energy means to provide a radial directional radiation pattern with respect to a vertical axis for said apparatus, and wall-engaging means connected to said shield means and extending therefrom in a generally radial direction away from said aperture to maintain said shield means proximate to the sidewall of the well bore thereby to maintain said aperture in a selected orientation with respect to the shortest radial distance between said axis and the sidewall of the borehole.

14. Apparatus for exploring boreholes comprising: a housing adapted to be passed through a borehole and slide along a side of the borehole and including a generally cylindrical section; a source of radiant energy carried by said housing for movement therewith; a radiant energy detector supported within said cylindrical section of said housing; a radiant energy shield of generally tubular configuration receiving said section of said housing for rotation with respect thereto and having a radiation-admitting aperture, said shield being operatively associated with said detector to provide a radial directional radiation pattern with respect to a vertical axis for said apparatus, wall-engaging means connected to said shield and extending in a generally radial direction away from said aperture to maintain said shield proximate to the sidewall of the borehole thereby maintaining said aperture substantially aligned with the shortest radial distance between said axis and the sidewall of the borehole; and indicator means electrically coupled to said detector.

15. Radioactivity apparatus for investigating material adjacent a well bore, comprising an elongated support adapted to be suspended from a cable for passage of said apparatus through the well bore in sliding contact with the well thereof, radiant energy source and detector means and shield means therefor carried by said support to provide selective response in one arcuate zone, at least one of said means being freely rotatable with respect to said support outside a well bore correspondingly orienting said arcuate zone, and means operative as said apparatus slides along a low side of the bore wall for continuously maintaining said one means positioned to orient said arcuate zone in the direction of sliding contact with the bore wall.

References Cited in the file of this patent

UNITED STATES PATENTS

| | | | |
|---|---|---|---|
| 2,316,361 | Piety | Apr. 13, | 1943 |
| 2,580,457 | Norris | Jan 1, | 1952 |
| 2,769,918 | Tittle | Nov. 6, | 1956 |
| 2,817,808 | Gieske | Dec. 24, | 1957 |
| 2,842,678 | Silverman | July 8, | 1958 |
| 2,856,536 | Cardwell | Oct. 14, | 1958 |